(12) United States Patent
Wise

(10) Patent No.: US 6,810,080 B1
(45) Date of Patent: Oct. 26, 2004

(54) METHOD AND APPARATUS FOR DECODING VIDEO DATA

(75) Inventor: Adrian Philip Wise, Bracknell (GB)

(73) Assignee: LSI Logic Corporation, Milpitas, CA (US)

( * ) Notice: Subject to any disclaimer, the term of this patent is extended or adjusted under 35 U.S.C. 154(b) by 731 days.

(21) Appl. No.: 09/126,171

(22) Filed: Jul. 30, 1998

(30) Foreign Application Priority Data

Jul. 31, 1997 (GB) .............................. 9716293

(51) Int. Cl.[7] .............................................. H04B 7/60
(52) U.S. Cl. ................................................ 375/240.15
(58) Field of Search ........................... 375/240, 240.01, 375/240.02, 240.03, 240.12, 240.11, 240.13, 240.14, 240.15, 240.16; 348/415.1, 416.1, 445, 446, 426.1; 382/232, 233, 234, 236; H04B 1/66

(56) References Cited

U.S. PATENT DOCUMENTS

| | | | | |
|---|---|---|---|---|
| 5,574,504 A | * | 11/1996 | Yagasaki et al. | ............ 348/415 |
| 5,717,461 A | * | 2/1998 | Hoogenboom | ............. 348/394 |
| 5,731,839 A | * | 3/1998 | Panaro | .................... 348/416.1 |
| 5,742,347 A | * | 4/1998 | Kandlur et al. | .......... 348/426.1 |
| 5,903,282 A | * | 5/1999 | Schoner et al. | ............. 345/507 |
| 6,115,072 A | * | 9/2000 | Vuong et al. | ............... 348/445 |
| 6,130,963 A | * | 10/2000 | Uz et al. | ..................... 382/233 |
| 6,144,323 A | * | 11/2000 | Wise | ........................... 341/76 |
| 6,147,712 A | * | 11/2000 | Shimamoto et al. | ........ 348/446 |
| 6,222,886 B1 | * | 4/2001 | Yogeshwar | ............ 375/240.23 |
| 6,289,053 B1 | * | 9/2001 | Varanasi et al. | ......... 375/240.1 |

* cited by examiner

Primary Examiner—Tung T. Vo
(74) Attorney, Agent, or Firm—Christopher P. Maiorana, P.C.

(57) ABSTRACT

A video decoder for decoding video pictures encoded according to the MPEG-2 standard, having reduced memory requirements, including a memory for storing means for storing a plurality of anchor frames, the decoder employing such anchor frames to generate B-frames, and including block-to-raster buffer means for holding B-frame data for display, the decoder being operable in first and second modes of operation, wherein in a first mode of operation a picture is encoded as a single frame and the video decoder decodes the entire frame twice wherein in a first decoding a set of lines of a first field are provided to the buffer for display, whereas in a second decoding lines from a second field are provided to the buffer for display; and wherein in a second mode of operation in which two consecutive field pictures of a frame are decoded, a first field picture is decoded and provided to the buffer means for display, and then a second field picture is decoded and provided to the buffer means for display. In order to reduce memory requirement still further, data can be stored in the buffer in any available memory location, the addresses of the locations being held in a pointer table.

19 Claims, 6 Drawing Sheets

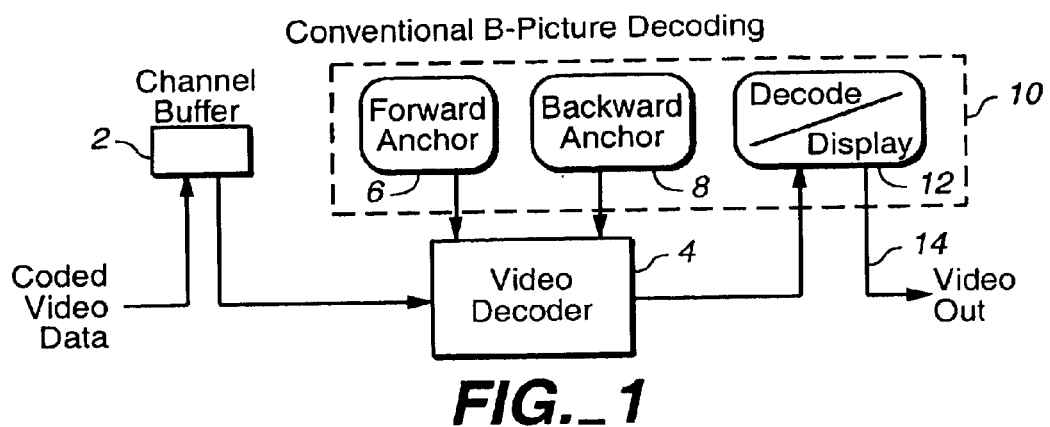
FIG._1
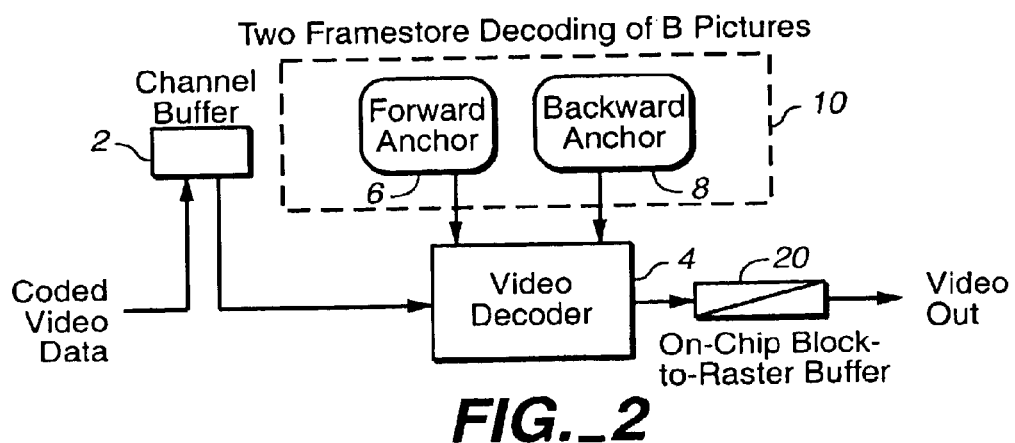
FIG._2
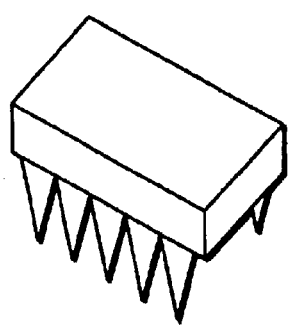
FIG._12

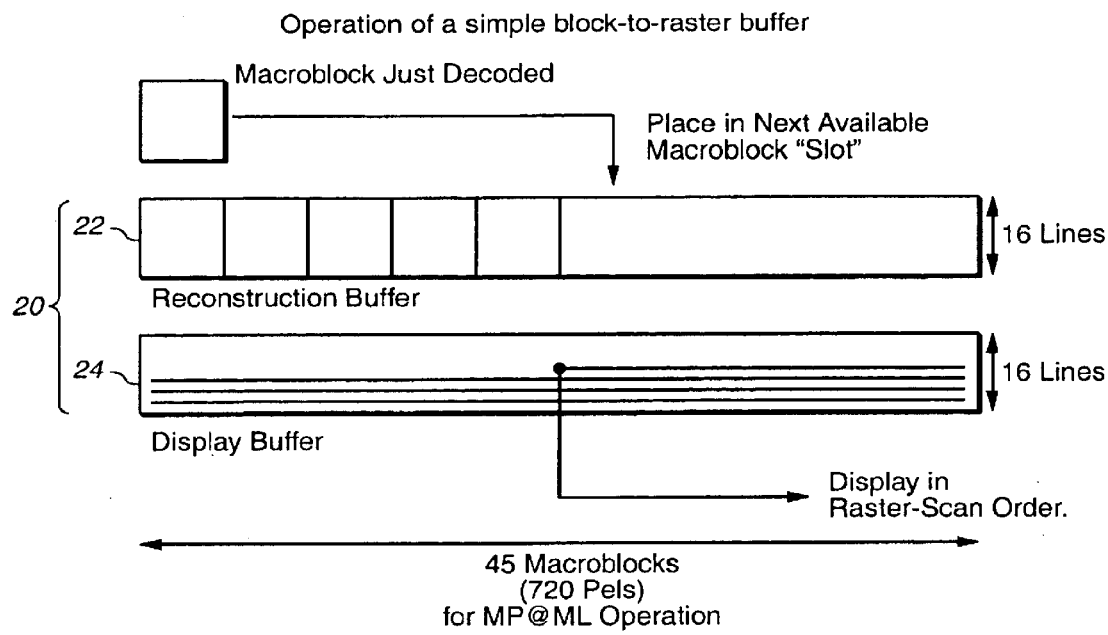
FIG._3
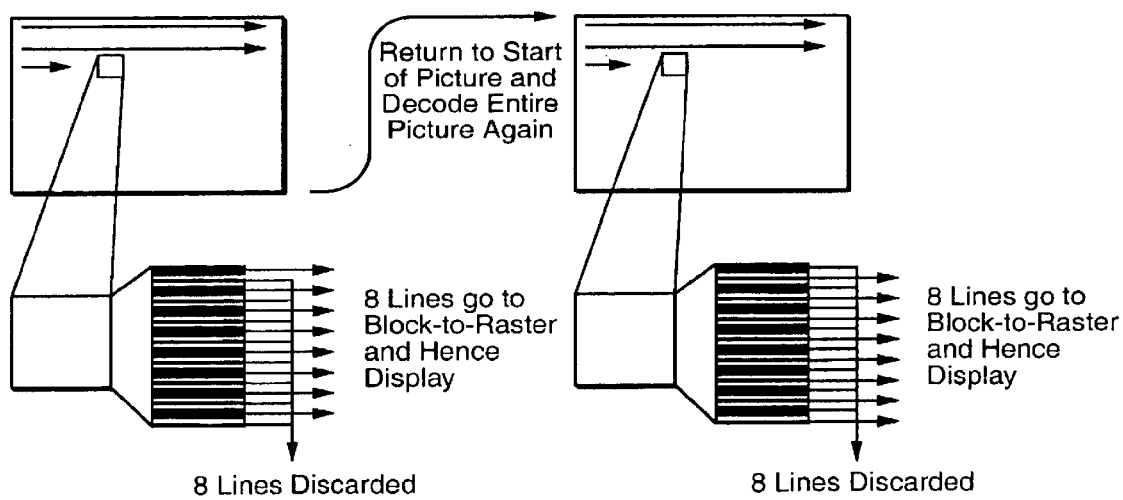
FIG._4

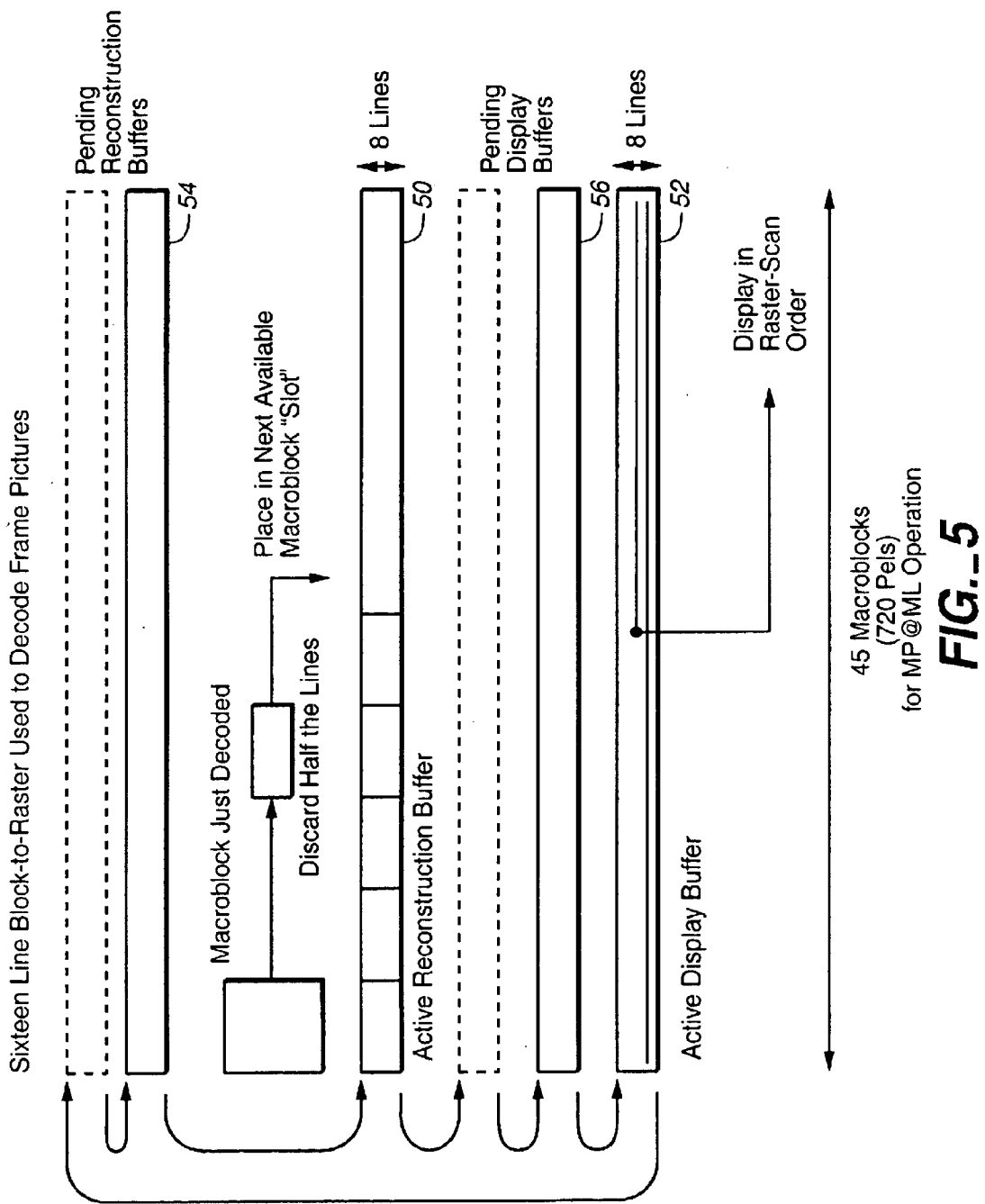
FIG._5

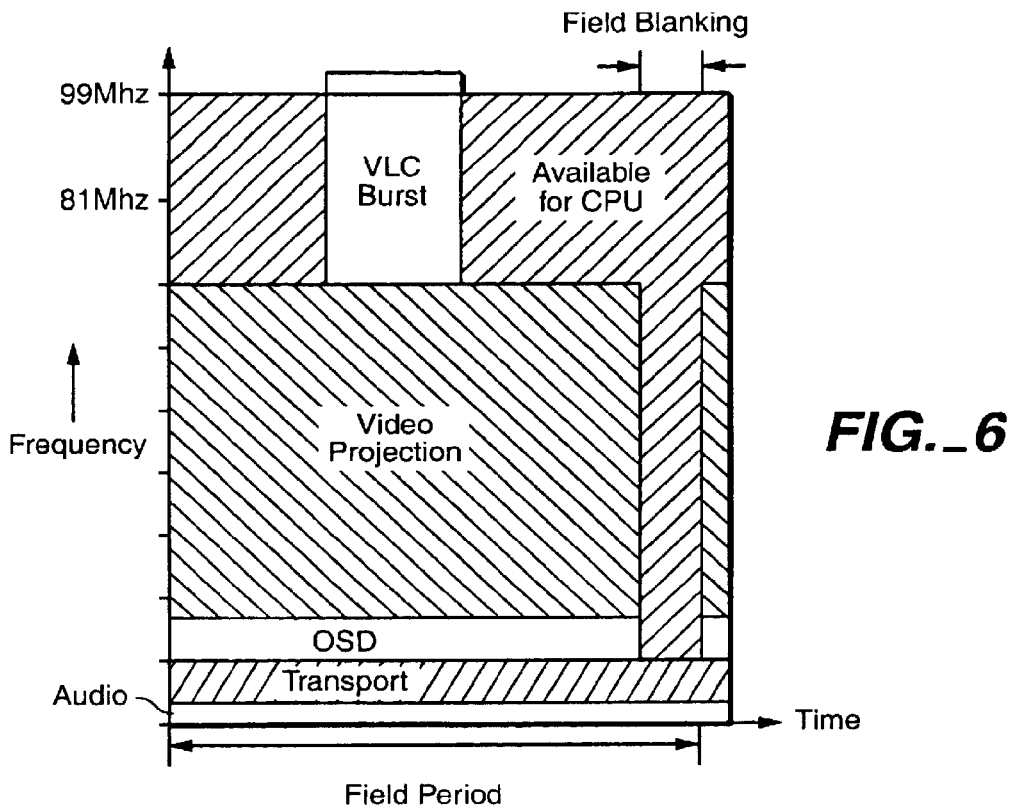
FIG._6
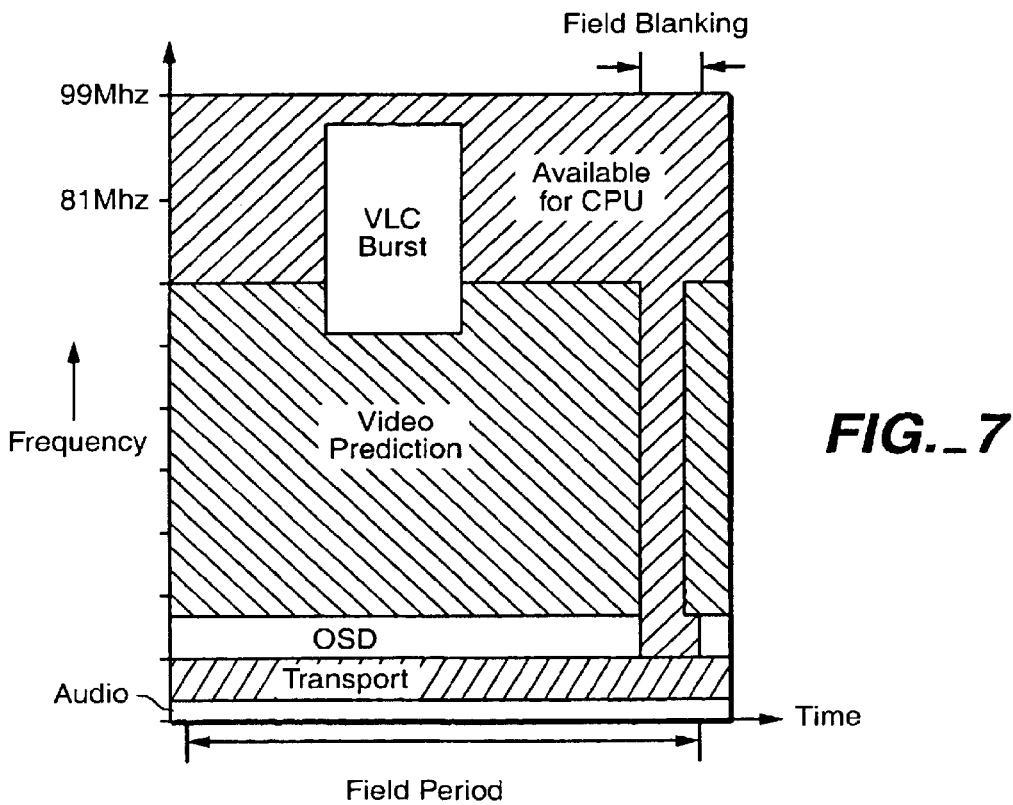
FIG._7

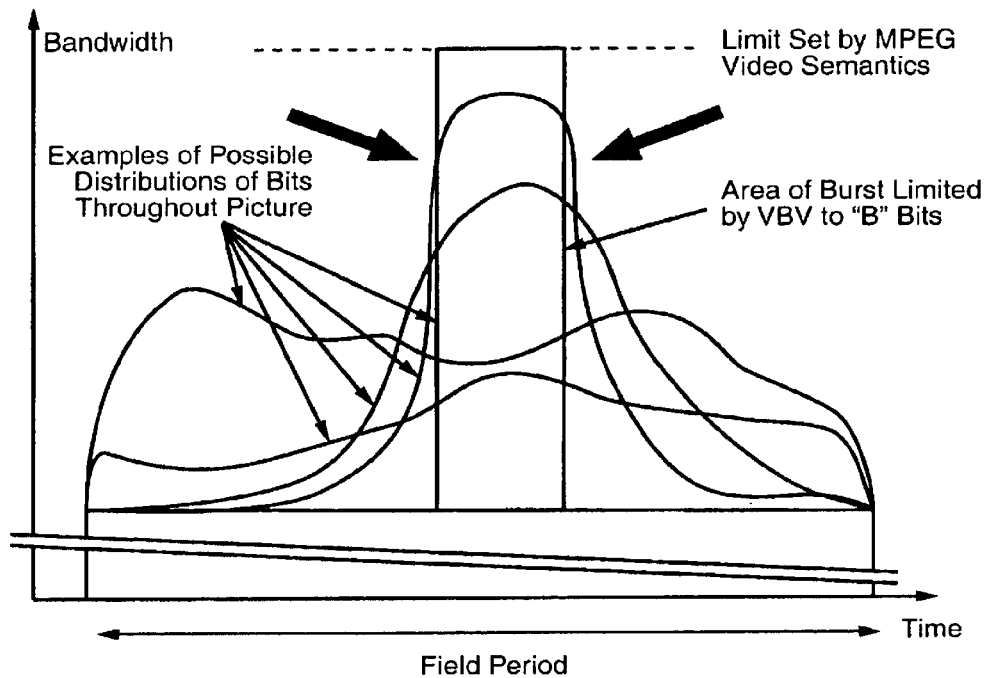
FIG._8
Eight Line Method for Handling Field B-Pictures
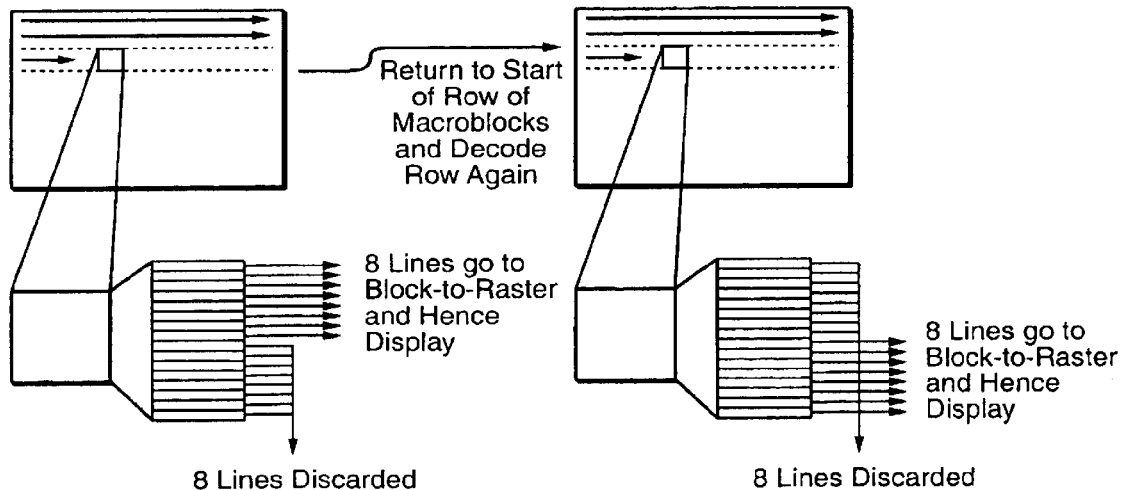
FIG._9

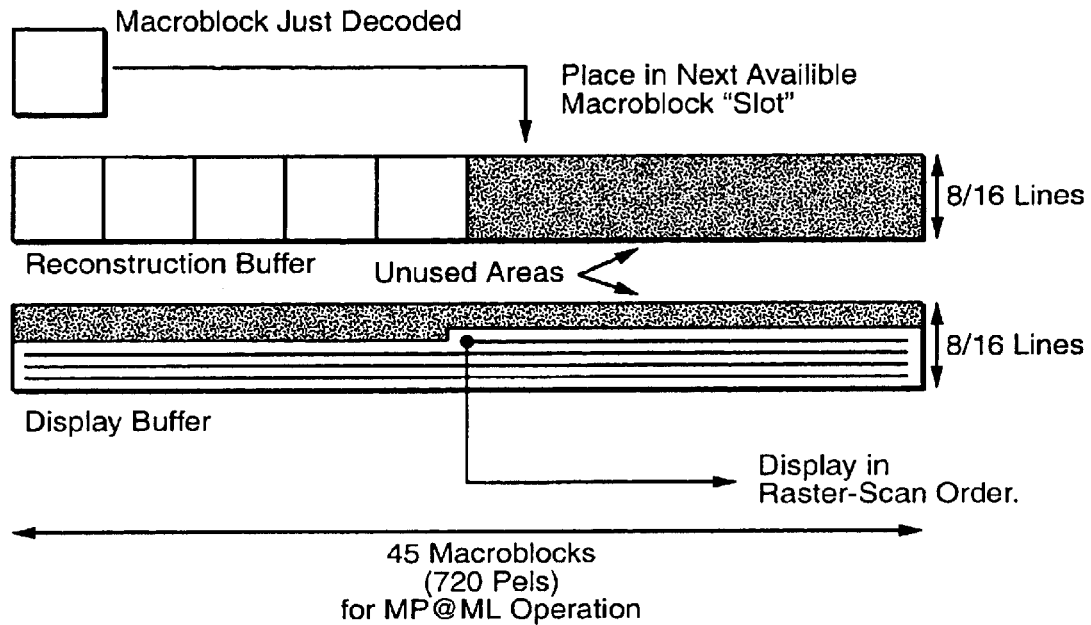
FIG._10
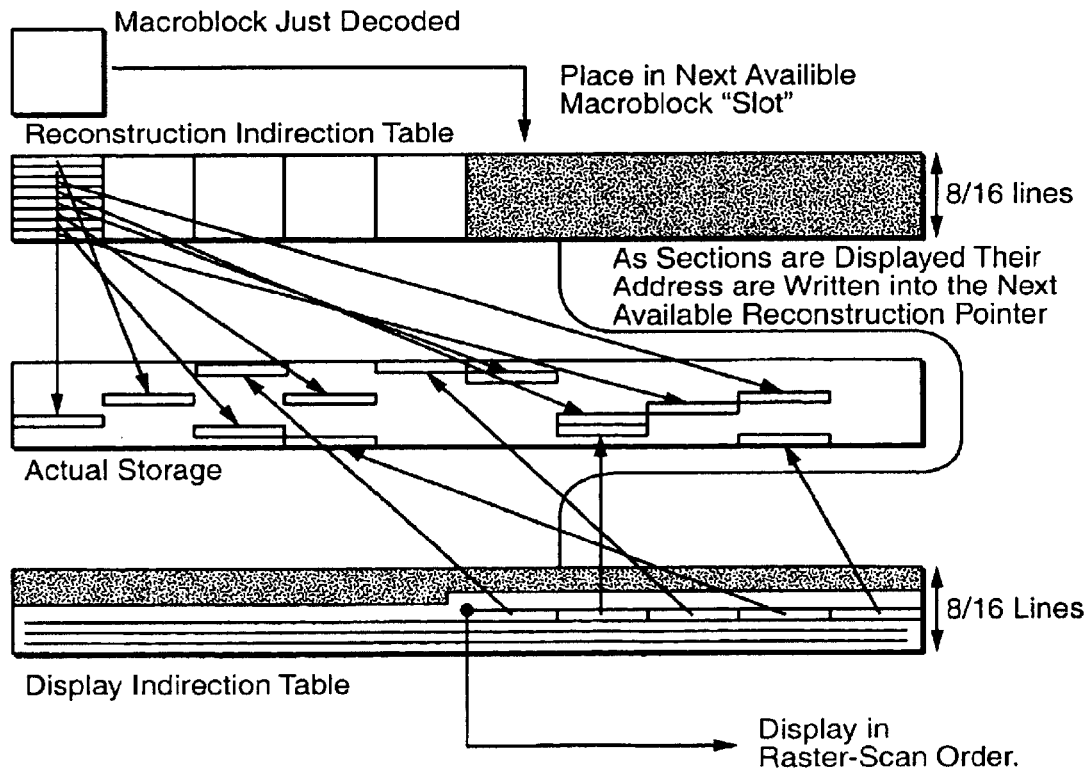
FIG._11

METHOD AND APPARATUS FOR DECODING VIDEO DATA

The present invention relates to the decoding of video bit-streams, particularly although not exclusively encoded according to International Standard ISO/IEC 13818-2 (commonly referred to as MPEG-2 video).

In accordance with customary terminology in the video art, the term "frame" as used herein consists of two fields, which fields are interlaced together to provide an image, as with conventional analog television. The term "picture" is intended to mean a set of data in a bit-stream for representing an image. A video encoder may choose to code a frame as a single frame picture in which case there is a single picture transmitted consisting of two interlaced fields, or as two separate field pictures for subsequent interlacing, in which case two consecutive pictures are transmitted by the encoder. In a frame picture the two fields are interleaved with one another on a line-by-line basis.

Pels ("Picture Elements") usually consist of an 8 bit (sometimes 10 bit) number representing the intensity of a given component of the image at the specific point in the image where that pel occurs. In a picture (field-picture or frame-picture), the pels are grouped into blocks, each block having 64 pels organised as 8 rows by 8 columns. Six such blocks are grouped together to form a "macroblock". Four of these represent a 16 by 16 area of the luminance signal. The remaining two represent the same physical area of the image but are the two colour difference signals (sampled at half the linear resolution as the luminance). Within a picture the macroblocks are processed in the same order as words are read on the page i.e. starting at the top-left and progressing left-to-right before going to the next row (of macroblocks) down, which is again processed in left-to-right order. This continues until the bottom-right macroblock in the picture is reached.

MPEG video is composed of a number of different types of pictures, or, more properly, frames, denoted as (a) I-frames (Intra Frames) which are compressed using intraframe coding and do not reference any other frames in the coded stream;

(b) P-frames (Predicted Frames) which are coded using motion-compensated prediction from past I-frames or P-frames; and (c) B-frames (Bidirectionally Predicted Frames) which provide a high degree of compression and are coded using motion-compensated prediction from either past and/or future I-frames or P-frames.

The present invention is particularly concerned with the decoding of B-frames, and for the purposes of this specification the I-frames and P-frames may be viewed as equivalent to one another and will be referred to herein collectively as "anchor frames". According to the MPEG-2 standard, it is necessary to maintain two decoded anchor frames, which are used to form predictions when decoding B-frames.

Referring to FIG. 1, which is a block diagram of a prior art arrangement for decoding B-frames, coded video data is input to a channel buffer 2 which feeds the data to a video decoder device 4 having a forward anchor 6 and a backward anchor 8 stored in a memory device 10. The video decoder provides in a memory region 12 of memory 10 a decoded version of a B-frame, region 12 being accessed by a display to provide an output on line 14 to a display. Typically, display of the first field of a decoded B-frame commences a little longer than a field time (half a frame time) after it has started to be placed in the frame store 12 by the video decoder. As a result of three images being stored in memory 12, it is necessary to provide a large quantity of memory, commonly implemented as DRAM or SDRAM connected externally to the video decoder.

A prior improvement to this scheme reduces the requirement for the third frame store to a requirement for an amount of storage a little larger than that required to hold a field of video (half a frame store). This is often referred to as a 2.5 frame store operation.

EP-A-0732857 discloses an arrangement for reducing the amount of memory required as compared with the arrangement of FIG. 1 wherein the third frame store is eliminated and replaced by a block-to-raster buffer so that as a B-frame is decoded by the decoder, it is fed to the buffer and written to the display screen as soon as a certain number of lines of the frame have been stored in the buffer. EP-A-0732857 is particularly concerned with decoding a single frame picture consisting of two interlaced fields. Each B-frame is decoded twice during the display of the image, on a first occasion while a first field of the image is displayed and on a second occasion while the second field to be interlaced is directly displayed. The decoder processes the images in macroblocks, and a converter circuit receives the image data, and supplies lines of the same field to the display. The problem with the arrangement disclosed in EP-A-0732857 is that it does not disclose a system which is able to cope with all possibilities in the form of an encoded frame, whether as described above, a single frame picture or two consecutive field pictures.

It is an object of the invention to provide a video decoder for decoding MPEG-2 pictures which is sufficiently versatile to cope with all possibilities of encoded frame, and which will provide a decoding capability in a efficient memory conserving manner.

In one aspect, the present invention provides a video decoder for decoding encoded video pictures, including memory means for storing a plurality of anchor frames, the decoder employing such anchor frames for decoding intermediate frames, and including buffer means for holding intermediate frame data for display, characterised in that the decoder is operable in first and second modes of operation, wherein in a first mode of operation a picture is encoded as a single frame and the video decoder decodes the frame twice wherein in a first decoding a set of lines of a first field are provided to the buffer means for display, whereas in a second decoding a set of lines from a second field are provided to the buffer means for display; and wherein in a second mode of operation in which two consecutive field pictures of a frame are decoded, a first field picture is decoded and provided to the buffer means for display, and then a second field picture is decoded and provided to the buffer means for display.

In a further aspect, the present invention provides a method of decoding encoded video pictures, comprising:

storing a plurality of anchor frames in memory means, employing such anchor frames for decoding intermediate frames, and holding intermediate frame data for display in buffer means;

characterised by first and second alternative modes, wherein a first mode comprises:

providing a picture as a single frame and decoding the frame a first time and providing a set of lines of a first field to the buffer means for display, and decoding the frame a second time and providing a set of lines of a second field to the buffer means for display; and wherein a second mode comprises providing two consecutive field pictures, and decoding a first field picture and providing the picture to the buffer means for display, and decoding a second field picture and providing the picture to the buffer means for display.

The configuration of the buffer means will usually vary, according to the mode of operation. Thus, in the second mode of operation, the buffer simply has to reconstruct the data from the incoming macroblocks (where the data is encoded according to the MPEG-2 standard) and display the reconstructed data. The buffer means may therefore be configured as two separate 16 line buffers, the first a reconstruction buffer which receives macroblocks decoded, and a second buffer or display buffer for displaying data when transferred from the reconstruction buffer. Whilst this arrangement has the advantage of simplicity, a disadvantage is the large size of buffer required. An alternative and preferred technique is therefore to configure the buffer so that only 8 lines are required. In this arrangement, in said second mode of operation, a row of macroblocks are decoded for a single field picture. Whilst all of the 16 line macroblock belong to the current field, nevertheless half of the lines are discarded, for example those in the lower half of the block. Once the row of macroblocks has been constructed in the buffer to provide 8 lines for display, the decoder returns to the start of the macroblock row and decodes them again, and this time the upper 8 lines are discarded and the lower 8 lines are transferred to the block to raster buffer. Thus, the buffer provides data to the display 8 lines at a time. A principal advantage of this 8 line method is that the amount of storage required for the block-to-raster buffer means is reduced to one half of that required by the 16 line method.

In the first mode of operation for a frame picture, the picture is received as a single frame of interlaced data, and it is necessary that the video decoder decodes the entire frame twice in order to display both fields of the pictures. During the first decoding of the frame the lines of one field are displayed and the other lines of the other field are discarded and in the second decoding the lines of the second field are displayed, the remaining lines being discarded. As will become clear from below, the buffer means is configured to provide eight line reconstruction and display buffers.

In order to reduce the size of the block-to-raster buffer still further a pointer table method is used. This recognizes that the buffers described above are on average half empty during use. In this arrangement when a macroblock is decoded, the data is placed in any available location in the buffer, but a table is kept as a pointer to the various memory locations.

Methods for reducing memory buffer size are known; see for example U.S. Pat. No. 5,151,976, wherein saw tooth data is stored in memory as M stripes of N pixels. In order to avoid first and second memories in which data is alternately read and written, with consequent large memory requirements, data is read and written from the same memory section, wherein the memory is organised according to an addressing scheme wherein a memory location $A_{i,j}$ is determined by $A_{i+1,j}=(A_{i,j}+x_j)$ Modulo (MN-1), $x_{j+1}=$ $N.x_j$ Modulo (MN-1). However this method is not appropriate where the size of the memory or buffer does not match the length of the stripes.

In contrast the present invention provides in a further aspect a video decoder for decoding encoded video pictures, including memory means for storing a plurality of anchor frames, the decoder employing such anchor frames for decoding intermediate frames, and including buffer means for holding intermediate frame data for display, characterised in that the buffer means includes a pointer table with means for distributing incoming data to any available memory location in the buffer, the address of the memory location being stored in the pointer table.

BRIEF DESCRIPTION OF THE DRAWINGS

Preferred embodiments of the invention will now be described with reference to the accompanying drawings wherein:

FIG. 1 is a schematic view of a prior art arrangement for decoding B-frames;

FIG. 2 is a schematic view of a preferred embodiment of the invention;

FIG. 3 is a schematic view for the purposes of explanation of a second mode of operation of the block-to-raster buffer in accordance with the invention;

FIG. 4 is a schematic diagram showing the operation of the video decoder according to the invention when decoding a single frame picture;

FIG. 5 is a schematic view for the purposes of explanation of the block-to-raster buffer when decoding frame pictures;

FIGS. 6, 7 and 8 are diagrams illustrating bandwidth requirements of the video decoder according to the invention;

FIG. 9 is a schematic view illustrating the operation of the video decoder according to the invention in a second mode of operation for handling field pictures;

FIGS. 10 and 11 are schematic views for explaining a different configuration of the block-to-raster buffer of the invention with a pointer table; and FIG. 12 is a schematic view of an integrated circuit chip incorporating a video decoder according to the invention.

DESCRIPTION OF THE PREFERRED EMBODIMENTS

Referring now to FIG. 2, illustrating an embodiment of the invention, similar items to those shown in FIG. 1 are denoted by the same reference numeral. The major difference is the provision of an on-chip block-to-raster buffer 20 connected to the video decoder, and the elimination of memory region 12 for storing a decoded B-frame.

Since the decoder 4 processes macroblocks it can be seen that it produces output for 16 consecutive (luminance) lines (and their associated 8 chrominance lines in each of two colour difference components) in the picture effectively simultaneously. However, the display must progress in raster-scan order (left-to-right, top-to-bottom) line-by-line rather than macroblock row by macroblock row.

Referring to FIG. 3, this shows operation of a simple block-to-raster buffer 20 in the second mode of operation for decoding a field picture. Processing of the macroblocks which have previously been decoded by the video decoder occurs in two passes.

1. First, the macroblocks for an entire row of macroblocks are decoded, one after another, and placed in successive "slots" in the block-to-raster buffer.
2. Once an entire row of macroblocks have been decoded and saved in the buffer as described, display commences. The data is read out line-by-line and sent to the display.

Since the display process needs to be continuous it is necessary to have two buffers 22, 24 as shown. While buffer 22 is being used as a "reconstruction buffer" and is filled by the output of the video decoder, buffer 24 is being used as a "display buffer" and is emptied as data is sent to the display. Once the display buffer is empty and the reconstruction buffer is full, the two buffers are swapped over.

While the recently decoded row of macroblocks is displayed the next row of macroblocks is decoded into the buffer, which until recently, was the display buffer.

FIG. 3 only shows the process for the luminance signal. Chrominance data is handled in an analogous manner, either by enlarging the luminance buffer to a size which can accommodate the chrominance data or by providing an additional set of buffers for the chrominance. (Indeed it may be necessary to provide two additional buffers, one for each of the two colour difference components). However, in general each line of chrominance data will be read out twice in order to "up sample" the 8 lines of chrominance data normally present in a macroblock to match the 16 line of luminance data.

For a single frame picture comprising two interlaced fields, the fields must be displayed sequentially. If the picture is coded as a single frame each row of macroblocks will contain 8 lines from the field currently being displayed and 8 lines from the other field of the frame.

As shown in FIG. 4, it is necessary that the video decoder be capable of decoding, in said first mode of operation, the entire frame twice in order to display both fields of the picture. (There are cases when a picture must be decoded more than twice. These include the case that repeat-first-field=1 and also when a freeze-picture is required). During the first decoding of the frame the odd lines (say) are discarded and the even lines are provided to buffer 20 and displayed. During the second decoding, the even lines are discarded and the odd lines displayed. The decision as to whether to display even or odd lines first is dependent on the video bit stream which may choose to code the fields in either order.

Whilst either an 8 line or 16 line block-to-raster buffer may be used, if the block to raster buffer has 16 lines in it then the operation of the block-to-raster buffer must be modified when decoding single frame pictures comprising two interlaced fields. Previously, the block-to-raster buffer was divided into two halves; the reconstruction buffer and the display buffer. When each macroblock only yields 8 lines for storage in the block-to-raster buffer the buffer must be reorganised to be divided into four quarters, each 8 lines high, as indicated in FIG. 5. At any instant in time there will be one currently active reconstruction buffer 50 and one currently active display buffer 52. The remaining two quarters may each be thought of as a reconstruction buffer 54 (which is available to be filled by the output of the video decoder) or as a display buffer 56 (which contains decoded data which has not yet been displayed). Since an implementation must be able to deal with both field and frame pictures, it follows that the block-to-raster buffer must be reconfigurable to operate in the "two halves" mode of FIG. 3 and the "four quarters" mode of FIG. 5. This can most naturally be achieved by considering that the block-to-raster buffer always has four quarters. When decoding field pictures, two of these quarters must be allocated together to be used as the reconstruction buffer and two as the display buffer. It will be understood that the buffer will normally be implemented in RAM (or possibly DRAM or SRAM).

There are two methods for decoding field pictures where a frame is provided as two consecutive field pictures. Each has advantages and disadvantages. If a frame is coded as two field pictures there is no need to decode each picture twice. The first field picture is decoded and displayed. When this is completed, the second picture is decoded and displayed.

In order to make this scheme work, it is necessary to have a block-to-raster buffer capable of handling 16 lines of data, as described with reference to FIG. 3. The advantage of this method (the "16 line" method) is that with a 16 line block-to-raster buffer, when B-field pictures are decoded they are only decoded once (that is each macroblock within the picture is decoded only once). When this is compared to the B-frame picture case (where each macroblock is decoded twice) it is clear that the amount of memory bandwidth required to decode the B-field pictures is of the order of one half of that required for B-frame pictures.

However, the 16 line block-to-raster which is required for decoding B-field pictures is twice as large as required to decode B-frame pictures. It therefore provides useful extra on-chip buffering which can be exploited to reduce the (external) memory bandwidth requirements when decoding B-frame pictures.

If the decoding of the B-frame commences as soon as possible (and some while before it is required to start displaying the frame) then it follows that the decoder will fill all sixteen lines of the block-to-raster buffer before display commences. Thus, the decoder will have decoded not one, but two, complete rows of macroblocks before display commences. As the display progresses, the decoder will continue to refill the block-to-raster buffer and will, in ideal circumstances, remain two macroblock rows ahead of the display.

However, if the memory bandwidth is restricted, the decoder will fall behind.

The video display will not be disturbed (i.e. the decode/display machine as a whole will not fail) until the display catches the video decoder. Since the block-to-raster buffer starts with a whole "extra" row of macroblocks the decoder may fall progressively further behind its nominal decoding rate by up to one row of macroblocks.

This fact may be exploited in a number of ways:
1. It may allow decoding in a system which would otherwise not have sufficient memory bandwidth to operate correctly.
2. The system may choose to allocate the bandwidth made available by exploiting the memory bandwidth reduction to some other task. For instance, servicing the requirements of a microprocessor which is sharing the same memory as the video decoder.

FIG. 6 shows an example of the bandwidth used for a worst-case decode of B-frame on a certain memory system. The VLC burst is a period of worst-case memory bandwidth requirement. (Variable Length Code. Since the majority of the data coming from channel buffer into the video decoder in a worst-case burst is the Huffman coded data. (The Huffman codes are of variable length depending on what symbol they represent)).

FIG. 7 shows the same B-frame being decoded when the effect of the buffering in the block-to-raster buffer is taken into account.

As can be seen, the decoder progresses more slowly during the VLC burst than in FIG. 6. Because of this the memory accesses required by the decoding during this period are spread over a longer period of time and consequently the actual bandwidth required (for all video decoding relating memory accesses) is reduced proportionately.

In the case of "Main Profile at Main Level" (MP@ML, a particular defined set of constraints in MPEG-2, applicable to the coding of conventional definition television signals), the VLC burst can last for a maximum of $8\frac{1}{3}$ rows of macroblocks. Since those $8\frac{1}{3}$ rows can take (allowing for the buffering) $9\frac{1}{3}$ macroblock row times to decode, it follows that the peak memory bandwidth requirement is reduced to $8\frac{1}{3}/9\frac{1}{3} \cong 90\%$ of the value without buffering.

FIG. 6 shows other bandwidth requirements in addition to those of the video decoder. Those marked "OSD", "Transport" and "audio" are not associated with the video decoder. The "VLC burst" and "Video prediction" are the requirements of the video decoder (when operating in two-frame mode decoding a B-picture).

To explain the VLC bursts illustrated in FIG. 7 and FIG. 8, this is a very artificial situation which is caused by deliberately coding a picture so that the maximum number of bits are placed in the minimum number of macroblocks in the picture, in order to construct a theoretical worst case. It is possible to cause worst-case, or close to worst-case, prediction in macroblocks by spending very few bits. (This is because the vectors are differentially coded so once a worst-case half-pel prediction is set up on one macroblock, the subsequent macroblocks can very efficiently say "use the same vector as before"). So this causes a baseline prediction bandwidth which is essentially constant across a (worst-case) picture. The bandwidth out of the channel buffer can then be chosen arbitrarily to give the bandwidth above this prediction bandwidth.

FIG. 8 shows the way in which a worst-case VLC burst can be constructed. No bits at all (or in practice a very few to comply with MPEG syntactic requirements and specify a worst-case prediction) are used outside of the burst. Within the burst the maximum height is set by a semantic rule in MPEG limiting the size of a coded macroblock and the area of the burst is set by the MPEG VBV which limits the maximum number of bits in a picture (i.e. 1835008 bits for MP@ML).

It should be understood that the chances of a worst-case VLC burst occurring in a real video sequence is extremely small indeed. It is much more likely that there is a more even distribution of bits throughout the picture. It is also very unlikely that a B picture would use the maximum "B" bits. This is because B pictures typically use less than the average number of bits (e.g. the average number of bits in a frame is about 27% of the maximum "B"bits at 15 Mbit/s) in order that bits are "saved up" to be applied to the anchor frames which generally require more bits. In an anchor picture a VLC burst is of much less consequence because the bandwidth used for prediction, write-back and display is less than that used for the prediction (twice) in the B-frame decoding. Also, since there is twice as long to decode each macroblock in anchor frame decoding the worst case burst is half the height as in the B-frame decoding.

Disadvantages of the sixteen line method—The principal disadvantage of the sixteen line method is the large on-chip block to raster buffer which is required.

In order to reduce the size of the buffer, the 8 line method shown in FIG. 9 is employed. A row of macroblocks is decoded. Since this is a field picture, all of the 16 lines in the macroblock "belong" to the field currently being displayed. However, half of the lines (those in the lower half of the macroblock) are discarded. Once the row of macroblocks has been completed the decoder immediately returns to the start of the row of macroblocks and decodes it again. This time the upper 8 lines (which have already been placed in the block-to-raster buffer and are currently being displayed) are discarded. The lower 8 lines are transferred to the block-to-raster buffer. The decoder proceeds through the field picture, decoding each row of macroblocks twice over.

The decoder may still require a means to return to the start of the picture in order to decode it again in order to implement a freeze picture. However, in general each picture is only decoded once (though each row within the picture is decoded twice).

The advantage of this method of decoding field pictures is that it requires a smaller block-to-raster buffer (8 lines high) than would otherwise be required (16 lines high).

Advantages of the eight line method—The principal advantage of the eight line method is that the amount of storage required for block-to-raster buffer is reduced to one half of that required by the sixteen line method.

Disadvantage of the eight line method—The disadvantages of the eight line method relate to the external memory bandwidth required by the video decoder.

Since there is no buffering in the block-to-raster buffer, the video decoder operates in lock-step with the video display circuitry. This requires approximately 12% more memory bandwidth (for video decoding) than would be required with the 16 line method. Furthermore, the VLC burst represents a larger proportion a field time. For example, the VLC burst represents about 4.7 ms or 28% of a field time. However, with the 8 line method this increases to 9.3 ms or 56% of the field time (8⅓ macroblock rows in 15). This will be a disadvantage for other devices (such as CPU) which share the memory system since they must suffer the reduced memory bandwidth which is available to them for longer period of time.

In order to reduce the size of the buffer still further, a configuration is shown in FIGS. 10 and 11 which is equally applicable to the 8 line and 16 line method. FIG. 10 shows a simple block-to-raster buffer but indicates unused areas in the buffer. (Note that although the figures show the simpler "two halves" diagram the technique is equally applicable to the "four quarters" organisation which would be used when a sixteen line block-to-raster buffer is used for decoding frame B-pictures).

The area in the reconstruction buffer 22 is unused because newly decoded macroblocks have not yet been placed in the buffer. The area in the display buffer 24 is unused because the data that was stored there has already been displayed. The amount of storage is reduced by breaking the storage into small sections each of 16 bytes. These sections are considered to represent an area of the image which is 16 pels wide by 1 scan-line high. The reconstruction buffer and display buffers become indirection tables, each pointing at these "sections" in the main block-to-raster buffer as shown in FIG. 11. FIG. 11 shows this arrangement but only shows pointers 60 in the reconstruction and display indirection tables 62 for some of the data 64 (because it would be very confusing to draw them all). As the data in a "section" is displayed the memory locations in which that data was stored become available for the storage of newly decoded macroblock data. Accordingly, the address of that section (which, of course is the number stored in the display indirection table at that location) is written into the next available section of the reconstruction indirection table.

Once all of the sections of a macroblock "slot" have pointers to available storage locations the video decoder may store the decoded data for that location into the slot. As it does this, it uses the address in the reconstruction indirection table to locate the address in the actual storage where the data is to be stored.

The size of the "actual storage" is reduced to one half of that required by the simple block-to-raster buffer. However, the indirection tables themselves are of a significant size so that the saving is not as much as one half. For example, the total size of the actual storage is 16 lines each of 720 (eight bit) bytes; 92160 bits. There are 45×16=720 "sections" so 10 bits are required to uniquely address each section. Each indirection table requires 720 entries of 10 bits. So the total storage for the indirection tables is 720×10×214400 bits.

The saving is thus 92160−14400=77760 bits or 42%.

In a modification more buffer storage "sections" are provided than are actually required by the scheme of FIG.

11. The effect will be to decouple the video decoder somewhat from the video display. This is because if extra storage is provided the video decoder may decode into these "spare" sections even though the video display is not freeing up sections by displaying them.

This can be done particularly efficiently if it happens that the number of sections does not require that the number of bits to address the sections is increased. So for example, the number of sections in the example just given may be increased from 720 to as much as 1024 before the number of bits in each entry of the indirection table must be increased from 10 to 11.

The addition of such buffering will be of particular benefit if the 8-line scheme for field B-pictures is used. Since the principal disadvantage of the 8-line scheme is in its effect on the memory bandwidth as a consequence of the tight coupling between video decode and video display, this modification allows a compromise to be developed between the small block-to-raster buffer of the 8-line scheme and the reduced memory bandwidth of the 16-line scheme.

For example, an 8-line scheme block-to-raster buffer using the indirection technique would require:

720×8×8 bits=46080 bits of actual storage, organised as 360 sections (requiring 2×45×8×9 bits=6480 bits of indirection table).

This could be increased to have, say, 512 sections instead of 360. So 512×16×8=65536 bits of actual storage with no increase in the indirection table size: an increase of 37%.

In return the video decoder has 42% of a macroblock row of additional buffering. So the 8.33 row VLC burst may be decoded in 8.33+0.42=8.75 row times; a 5% reduction in external memory bandwidth requirements.

As regards the handling of chrominance data, there are a number of options for accommodating this:

Provide an additional block-to-raster buffer for the chrominance data.

Provide additional indirection tables for the chrominance but allow them to point at the same main storage area.

Merge the indirection tables for the chrominance into the same indirection tables as are used for luminance.

There is one issue which is peculiar to the chrominance data. This concerns the use of the 4:2:0 sampling data employed by MPEG. Not only does each line (of each of the two colour difference signals) have half of the number of samples (pels) as the luminance line, but also there half as many lines.

In order to display the final image the chrominance data must be doubled vertically so that there are as many lines of chrominance data as luminance.

In practice this means that each line of chrominance data must be displayed twice.

This may be conveniently accomplished by arranging that the first time chrominance line is displayed, its storage is not made available to the reconstruction buffer. Only when the line is displayed for the second time is the storage released and the indirection reconstruction table updated. This of course required that the "actual storage" is increased to accommodate one additional line beyond the minimum (5 lines instead of 4).

Additionally, the chrominance data may be filtered in the vertical direction. This might be achieved (in the case of a simple 2-tap filter) by reading two lines out in each display line.

What is claimed is:

1. A video decoder comprising:
   a memory for storing a plurality of anchor frames suitable for decoding a plurality of intermediate frames; and
   a buffer independent of the memory for holding intermediate frame data for display, characterised in that the video decoder is operable in first and second modes of operation,
   wherein in a first mode of operation a picture is encoded as a single frame and the video decoder decodes the single frame twice wherein (i) in a first decoding a set of lines of a first field of the single frame are provided to the buffer for display and (ii) in a second decoding a set of lines from a second field of the single frame are provided to the buffer for display; and
   wherein in a second mode of operation in which two consecutive field pictures of a frame are decoded, (i) a first field picture of the two consecutive field pictures is decoded and provided to the buffer for display and then (ii) a second field picture of the two consecutive field pictures is decoded and provided to the buffer for display.

2. The video decoder according to claim 1, further comprising:
   a display buffer for displaying data assembled in the buffer,
   wherein (i) the video decoder is arranged for decoding pictures encoded according to an MPEG-2 standard, (ii) the intermediate frames comprise B-frames, and (iii) the buffer is configured as a reconstruction buffer which receives decoded macroblocks.

3. The video decoder according to claim 2, wherein the display and the reconstruction buffers are each configured as 16 line buffers.

4. The video decoder according to claim 2, wherein the display and the reconstruction buffers are each configured as eight line buffers.

5. The video decoder according to claim 4, wherein in the second mode of operation, the decoder provides (i) firstly a first set of eight decoded lines for display and (ii) secondly a second set of eight lines for display, the first set and the second set comprising an upper and a lower halves of a 16 line section.

6. The video decoder according to claim 1, wherein the buffer includes a pointer table for distributing incoming data to any available location in the buffer with an address of each said location being stored in the pointer table.

7. The video decoder according to claim 1, further comprising:
   a second buffer for holding chrominance data,
   wherein said buffer is provided for holding luminance data.

8. The video decoder according to claim 1, wherein said video decoder is incorporated into an integrated circuit chip.

9. A method of decoding encoded video pictures, comprising the steps of:
   (A) storing a plurality of anchor frames in a memory;
   (B) employing the anchor frames for decoding a plurality of intermediate frames;
   (C) holding intermediate frame data for display in a buffer independent of the memory; and
   characterised by first and second alternative modes, wherein a first mode comprises the steps of:
   (D1) providing a picture as a frame; decoding the frame a first time;
   (F1) providing a set of lines of a first field of the frame to the buffer for display in response to decoding the frame the first time;
   (G1) decoding the frame a second time; and (H1) providing a set of lines of a second field of the frame to the buffer for display in response to decoding the frame the second time, wherein a second mode comprises the steps of:

(D2) providing two consecutive field pictures;

(E2) decoding a first field picture of the two consecutive field pictures;

(F2) providing the first field picture to the buffer for display;

(G2) decoding a second field picture of the two consecutive field pictures in response to decoding the first field picture; and (H2) providing the second field picture to the buffer for display in response to providing the first field picture to the buffer for display.

10. The method according to claim 9, wherein (i) The encoded video pictures are encoded according to an MPEG-2 standard, which are decoded as macroblocks, and (ii) the intermediate frames comprise B-frames.

11. The method according to claim 10, wherein a second buffer is provided for storing 16 lines of one said B-frame for display.

12. The method according to claim 10, wherein a second buffer is provided for holding a lines of one said B-frame for display.

13. The method according to claim 12, wherein in the second mode of operation the step of decoding comprises the sub-steps of:

providing a first set of eight decoded lines for display; and providing a second set of eight lines for display in response to providing the first set, wherein the first set and the second set comprise an upper and a lower halves of a 16 line section.

14. A video decoder comprising:

means for storing a plurality of anchor frames suitable for decoding a plurality of intermediate frames; and means for holding intermediate frame data for display, characterised in that the means for holding (i) is independent of the means for storing and (ii) includes a pointer table with (iii) means for distributing incoming data to any available location in the means for holding, an address of each said location being stored in the pointer table.

15. A video decoder system for decoding encoded video pictures, comprising:

a memory for storing a plurality of anchor frames;

a decoder coupled to said memory and which uses the anchor frames to decode a plurality of intermediate frames; and a buffer system independent of said memory coupled to said decoder and which holds data of the intermediate frames for display, wherein said decoder is operable in a first and a second operation modes:

in the first operation mode a picture is encoded as a single frame and said decoder decodes the single frame twice such that (i) in a first decoding a set of lines of a first field of said single frame are provided to said buffer system for display and (ii) in a second decoding a set of lines from a second field of said single frame are provided to said buffer system for display; and in the second operation mode said picture is encoded as a first field and a second field consecutively and said decoder (i) decodes a first field picture of the first field and provides the first field picture to said buffer system for display and then (ii) decodes a second field picture of the second field and provides the second field picture to said buffer system for display.

16. The video decoder system according to claim 15, wherein (i) the encoded video pictures are encoded according to an MPEG-2 standard and (ii) the intermediate frames comprise B-frames.

17. The video decoder system according to claim 16, wherein said buffer system includes a reconstruction buffer which receives decoded macroblocks and a display buffer for displaying data assembled in said reconstruction buffer.

18. The video decoder system according to claim 17, wherein said buffer system includes a pointer table which distributes incoming data to any available location in said buffer system and stores an address for each said location.

19. A video decoder system comprising:

a memory for storing a plurality of anchor frames;

a decoder coupled to said memory and which uses the anchor frames to decode a plurality of intermediate frames; and a buffer independent of said memory and coupled to said decoder for holding data of the intermediate frames for display, said buffer including a pointer table which distributes incoming data to any available location in said buffer and stores an address for each said location.

* * * * *